United States Patent [19]

Silfvast et al.

[11] 4,369,514
[45] Jan. 18, 1983

[54] RECOMBINATION LASER

[75] Inventors: William T. Silfvast, Holmdel, N.J.; Obert R. Wood, II, New York, N.Y.

[73] Assignee: Bell Telephone Laboratories, Incorporated, Murray Hill, N.J.

[21] Appl. No.: 202,069

[22] Filed: Oct. 30, 1980

[51] Int. Cl.³ .............................................. H01S 3/09
[52] U.S. Cl. ..................................... 372/89; 372/55; 372/69; 372/76
[58] Field of Search .................. 331/94.5 PE, 94.5 G

[56] References Cited

U.S. PATENT DOCUMENTS

| | | | |
|---|---|---|---|
| 3,757,248 | 9/1973 | Small | 331/94.5 |
| 3,864,643 | 2/1975 | Waynant | 331/94.5 |
| 3,891,941 | 6/1975 | Roberts et al. | 331/94.5 G |
| 3,916,338 | 10/1975 | Jensen et al. | 331/94.5 G |
| 4,114,113 | 9/1978 | Hasson et al. | 331/94.5 |
| 4,135,167 | 1/1979 | Godard | 331/94.5 |

OTHER PUBLICATIONS

"Simple Metal-Vapor Recombination Lasers Using Segmented Plasma Excitation", Silfvast et al., *Appl. Phys. Lett.*, vol. 36, No. 8, Apr. 1980, pp. 615–617.

"A Calculation of the Instantaneous Population Densities of Excited Levels of Hydrogen-Like Ions in a Plasma", by McWhirter et al., *Proc. Phys. Soc.*, vol. 82, p. 641.

"Laser Gain Around 18.2 nm Produced in Carbon Plasma at Hull University," *Laser Focus*, Aug. 1980, pp. 24, 26 and 28.

*Primary Examiner*—William L. Sikes
*Assistant Examiner*—Léon Scott, Jr.
*Attorney, Agent, or Firm*—Michael B. Einschlag; Erwin W. Pfeifle

[57] ABSTRACT

An efficient recombination laser comprises a resonant laser cavity, a gaseous laser material disposed in the cavity, and means for providing a plasma discharge in said laser material, which plasma discharge is confined to a cylindrical region along the axis of the laser cavity. The plasma in the gaseous laser material expands outward radially from the cylindrical region at the axis of the cavity and cools by interacting with the adjacent unexcited gas. The maximum laser gain is provided in an annular region, which annular region is adjacent to and surrounds the initial discharge cylindrical region. In one embodiment of the present invention, the means for providing the plasma discharge comprises two pin-type electrodes which extend into the cavity along the cavity axis.

18 Claims, 14 Drawing Figures

RECOMBINATION LASER

BACKGROUND OF THE INVENTION

The present invention pertains to the field of recombination lasers.

Only a few of the thousands of atomic laser transitions already discovered have achieved efficiencies greater than 1 percent. For example, the He-Neon laser at 6328 Å is perhaps the most well-known example of a neutral atomic species laser, but its efficiency is less than 0.1 percent. Commercially available Helium-Neon lasers typically require 10 W or more of electrical power to provide 1 or 2 mW of laser power at 6328 Å. The copper laser, probably the only neutral atomic laser with an efficiency above 1 percent, having yielded efficiencies as high as 2 percent, has problems in achieving long life at such efficiencies due to the difficulty involved in generating the required densities of copper vapor. In addition, the short pulse length and high gain further restrict the use of the copper laser.

Most neutral atom lasers which are excited by an electrical discharge are inefficient because the excitation energy produced by the electrical discharge excites a large number of states, each of which states can decay via a number of different decay paths.

SUMMARY OF THE INVENTION

An efficient recombination laser comprises a laser cavity, a gaseous laser material disposed in the cavity, and means for providing a plasma discharge in said laser material, which plasma discharge is confined to a cylindrical region along the axis of the laser cavity. The plasma in the gaseous laser material expands outward radially from the cylindrical region at the axis of the cavity and cools by interacting with the adjacent unexcited gas. The maximum laser gain is provided in an annular region, which annular region is adjacent to and surrounds the initial discharge cylindrical region.

In one embodiment of the present invention, the means for providing the plasma discharge comprises two pin-type electrodes which extend into the laser cavity along the cavity axis. In another embodiment utilizing the pin-type electrodes the density of the gaseous laser material is kept low enough to minimize radiation trapping and a buffer gas is added to the cavity to provide gas pressure sufficient to confine the discharge to a small central region along the cavity axis and sufficient to reduce the plasma electron temperature for optimal laser gain. The buffer gas also allows expansion and cooling of the plasma to occur without having interactions between the laser material and the cavity wall destroy excited states. Helium is a good buffer gas because its high ionization potential causes most of the plasma excitation to occur in the gaseous laser material and because its low mass provides rapid cooling of the electrons in the plasma.

BRIEF DESCRIPTION OF THE DRAWING

A complete understanding of the present invention may be gained from a consideration of the detailed description presented hereinbelow in connection with the accompanying diagrams in which.

DETAILED DESCRIPTION

Figure 1:
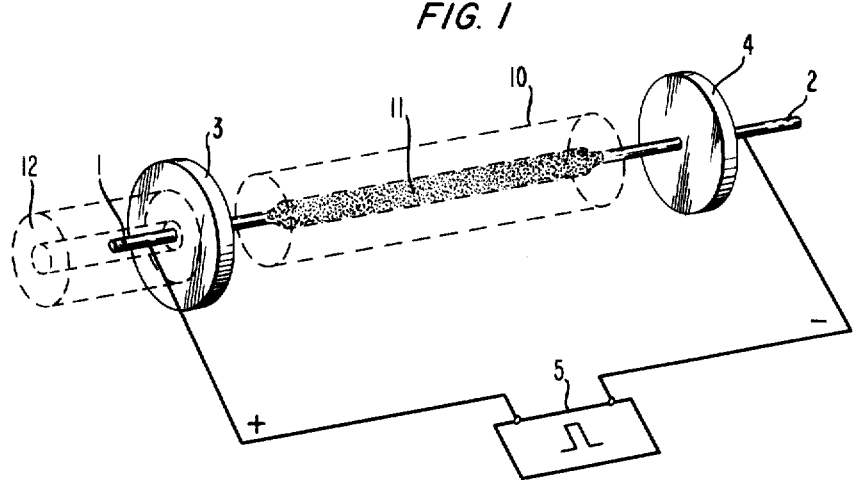
FIG. 1 shows, in pictorial form, the essential elements of an embodiment of the present invention which utilizes pin-type discharge electrodes.

FIG. 1 shows, in pictorial form, the essential elements of an embodiment of a plasma-recombination laser fabricated according to the present invention. Electrodes 1 and 2, which extend into a long, large diameter cylindrical laser cavity through the axes of mirrors 3 and 4, are pin-type electrodes. A pulsed electrical discharge between electrodes 1 and 2 is initiated by applying a high-voltage, high-current pulse from means 5 between the two pin-type electrodes 1 and 2. This produces a plasma in a gaseous material disposed between the electrodes, which plasma is confined to a cylindrical region 11 of the order of 1 cm in diameter or less along the axis of the laser cavity. The plasma then expands outward in a radial direction. As the plasma expands it is cooled by interacting with the adjacent unexcited gaseous material. The maximum gain for this laser occurs in an annular region 10, which annular region is adjacent to and surrounds the initial plasma discharge region 11. The laser radiation emerges from the cavity through mirror 3 as laser beam 12.

In order to keep the density of the laser material low enough to minimize radiation trapping effects, a buffer gas may be added to the laser cavity. The buffer gas is added at a high enough gas pressure to confine the plasma discharge region to a small central region along the laser cavity axis. The buffer gas also reduces the plasma electron temperature by collisional de-excitation to provide optimal laser gain. The buffer gas also allows expansion and cooling of the plasma to occur without having interactions between the laser material and the cavity wall destroy excited states. The buffer gas chosen should have a higher ionization potential than the gaseous laser material in order to minimize energy loss due to ionization of the buffer gas by the electrical discharge. If the buffer gas has a higher ionization potential than the gaseous laser material, the energy loss to the buffer gas is partially offset by the physical mechanisms of charge transfer and Penning ionization, which mechanisms provide for transfer of buffer gas excitation energy back to the gaseous laser material. Helium is a good choice for a buffer gas because it has such a high ionization potential that most of the excitation occurs in the gaseous laser material and because its low mass provides a rapid cooling of the plasma electrons due to collisional de-excitation.

Figure 2:
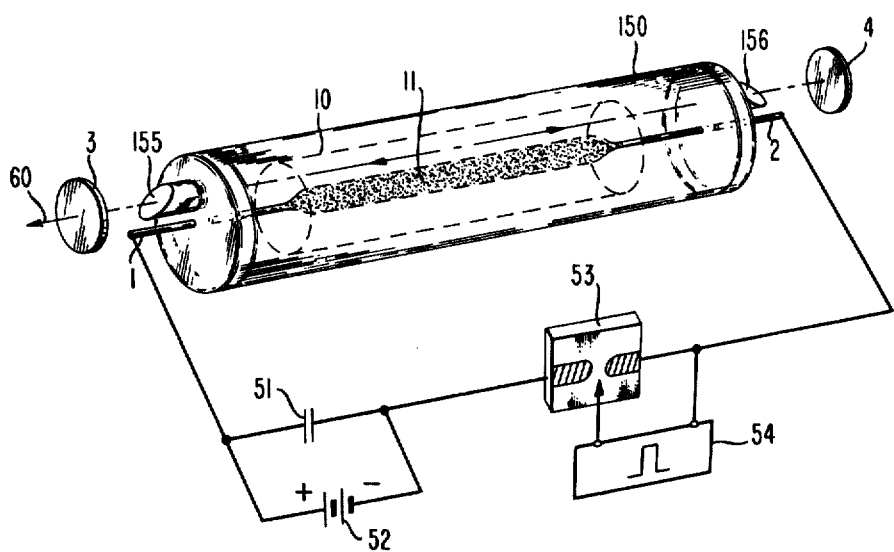
FIG. 2 shows, in pictorial form, an embodiment of the present invention which utilizes pin-type discharge electrodes, which embodiment is not as efficient as that shown in FIG. 1 because only a fraction of the active material is disposed within the resonant laser cavity.

FIG. 2 shows an embodiment of the present invention which utilizes a 2 inch diameter by 6 inch long cylindrical pyrex gas cell 150. The cell was fitted with two copper wire electrodes 1 and 2 whose ends were separated by 6-8 cm. The initial plasma 11 was created in a 1000:1 mixture of He:Xe at various pressures by discharging 0.01 $\mu$F capacitor 51, initially charged to 18 kv by DC supply 52, by means of 3-electrode spark gap 53 and trigger pulse input means 54. This produced a visible plasma 11 having approximately a 1 cm diameter.

The ends of gas cell 150 were fitted with KCL Brewster's angle windows 155 and 156. The recombination laser resonator cavity was formed by two 6 meter radius of curvature, gold coated concave mirrors 3 and 4. Mirror 3 had a 1 mm diameter central coupling hole for the 2.026 $\mu$m laser beam 60. The distance between the axis of this laser resonator and the axis of the cylindrical gas cell was continuously adjustable from 0 (on axis) to ±2.5 cm.

Figure 3:
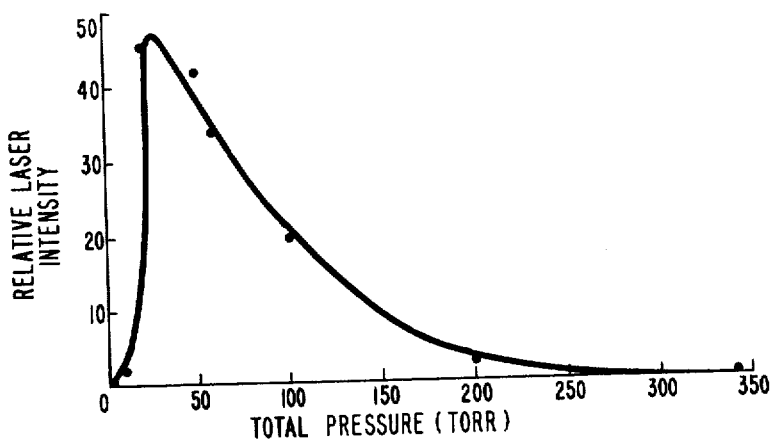
FIG. 3 shows, in graphical form, the laser intensity versus total gas pressure for the embodiment shown in FIG. 2.

Laser action at 2.026 $\mu$m at total gas pressures up to 700 Torr was observed, in some cases. However, the behavior of laser intensity on total pressure was more typically that shown in FIG. 3. The optimum gas mixture was a 1000:1 mixture of He:Xe where Xe was the active species and He acted as a buffer.

Figure 4:
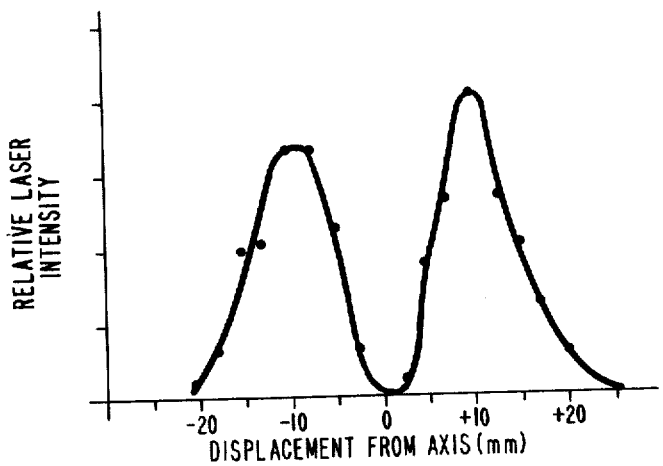
FIG. 4 shows, in graphical form, the laser intensity versus displacement from the pin-type electrode axis for the embodiment shown in FIG. 2.

FIG. 4 shows a plot of the relative laser intensity on the 2.026 $\mu$m line in a 1000:1 mixture of He:Xe at 40 Torr total pressure as a function of distance from the axis of the gas cell. The region of gain clearly occurs in annular region 10 beyond initial plasma 11.

Figure 5:
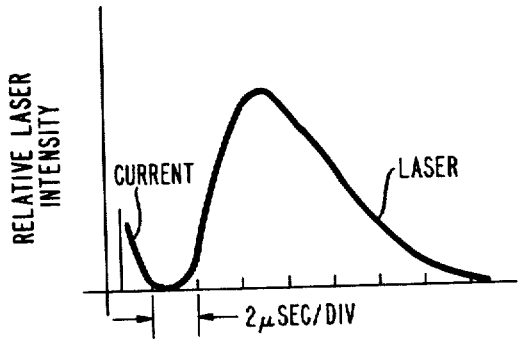
FIG. 5 shows, in graphical form, the laser intensity versus time for the embodiment shown in FIG. 2.

A trace of an oscilloscope photograph of the temporal behavior of this device operating at a total pressure of 20 Torr is shown in FIG. 5. The start of the laser pulse is seen to be delayed approximately 2 $\mu$sec from the termination of the current pulse. This delay is a characteristic feature of recombination lasers. Several emission lines were observed in laser action. The strongest was the 2.026 $\mu$m $5d[3/2]°-6p[3/2]$ transition in Xe. The maximum observed small-signal gain on this transition was greater than 10 percent/cm.

The highest output power from this device was about 300 Watts peak. The output energy is given by 300 Watt × 6 $\mu$sec = 1.8 mJ. The maximum possible input energy is the 1.62 J of energy stored in the 0.01 $\mu$F capacitor charged to 18 kV. Consequently, the overall efficiency of this device was at least 0.1 percent and probably a good deal higher, since power was extracted from only a small fraction of the active volume and no account has been taken of the energy dissipated in the spark gap. These results include no measurements from a larger device where meaningful attempts to optimize the output efficiency can be made.

Limits on the size of the gas cell can be obtained from FIGS. 4 and 5. It is known that a shock wave travels away from initial plasma region 11 in the buffer gas at a velocity of about $5 \times 10^5$ cm/sec. In order that the shock wave reflected from the gas cell walls not disturb the homogeneity of gain region 10 during the time of peak gain (see FIG. 5), i.e., 6 $\mu$sec from the end of the current pulse, the cell must be at least 2.0 cm in radius. FIG. 4 shows that the laser gain extends out to approximately 2.5 cm from the axis of the cell. Consequently, the minimum gas cell diameter for an efficient laser is about 2 inches. The maximum gas cell diameter is limited only by practical consideration. On the other hand, if a number (N) of cylindrically-shaped initial plasmas were arranged in parallel in the same gas cell, the cross sectional area of the gas cell would necessarily be N times the area of a single plasma.

The limits on the length, here taken as the spacing between electrodes, of an efficient annular recombination laser are also quite wide. The minimum length is set by the small signal gain of the laser transition. The highest reported, to date, is 55 percent/cm in Xe at 2.026 $\mu$m. To overcome unavoidable losses in the windows and mirrors of say 0.2 percent, the minimum length for such a laser could be less than 1 mm. The maximum length for the laser is set by the practical difficulty of maintaining the straightness of the initial cylindrically-shaped plasma and several techniques are disclosed to achieve said straightness.

Many elements would make suitable candidates for an efficient recombination laser. Several of the more promising elements, listed in Table 1, are not gases at room temperature. Using vapors to provide the active species would require additional heat input, for example, with an oven. Consequently high vapor pressure materials would be the most desirable. A self-heated cell, as is done in some Cu vapor lasers, operated at high repetition rates could eliminate this potential loss in efficiency. Another possibility is to produce the vapor by sputtering material from electrodes by an electrical discharge as shown in an article entitled "Simple Metal-Vapor Recombination Lasers Using Segmented Plasma Excitation," Appl. Phys. Lett., Vol. 36, No. 8, April 1980, pp. 615-617 by W. T. Silfvast, L. H. Szeto and O. R. Wood II. We also note that recombination lasers based on metal-vapors appear to have a lower optimum buffer gas pressure. In fact, in most cases the optimum pressure for the He buffer is about 2.5 Torr.

Figure 6:
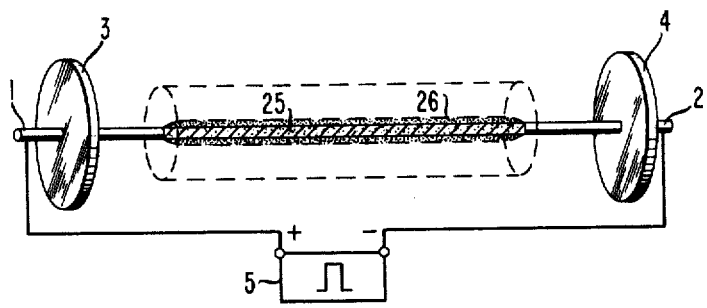
FIG. 6 shows, in pictorial form, the essential elements of an embodiment of the present invention which utilizes an insulator rod to help stabilize the position of discharge plasma.

FIG. 6 shows the essential elements of a further embodiment of the present invention. Insulator rod 25 is supported between pin-type electrodes 1 and 2. Pin-type electrodes are inserted into the cavity formed by mirrors 3 and 4. When a high-voltage, high-current pulse is applied to pin-type electrodes 1 and 2 from pulse means 5 a coronal discharge along the surface of insulator rod 25 is formed. The coronal discharge tends to preionize the laser material in the cylindrical region 26 near the insulator rod 25 and stabilize the discharge, causing it to occupy a small cylindrical region near insulator rod 25. Then the plasma formed in region 26 expands into annular gain region 27 where laser action is produced as described hereinabove. By stabilization of the discharge we mean the production of a discharge which is uniformly distributed in space. The insulator may be fabricated from glass, ceramic or some semiconductor material such as carbon or graphite.

In an additional embodiment using the configuration shown in FIG. 6, insulator rod 26 may be illuminated with UV light to produce photoemission of electrons. These photo-produced electrons preionize a defined gas volume and provide, thereby, a stabilization of the discharge produced by the high-voltage, high-current pulse impressed across pin-type electrodes 1 and 2. The means for providing the UV light are well known to those skilled in the art.

Figure 7:
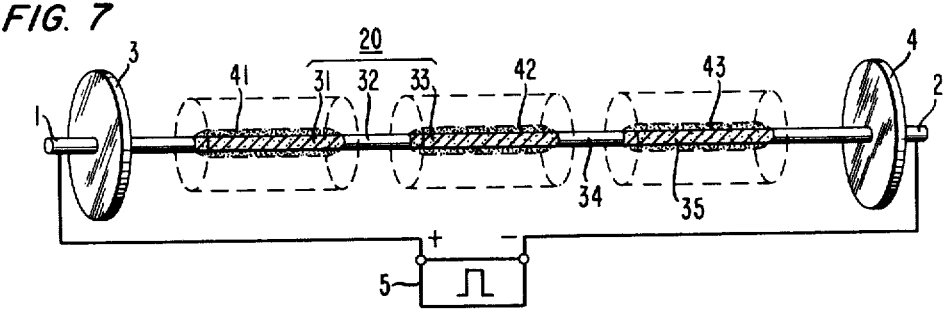
FIG. 7 shows, in pictorial form, the essential elements of an embodiment of the present invention which utilizes a series of insulator rods.

FIG. 7 shows the essential elements of a further embodiment of the present invention. Rod 30 is made up of a series of metal segments 1, 32, 34 and 2 and insulating rod segments 31, 33 and 35. When a high-voltage, high-current pulse produced by means 5 is applied to electrodes 1 and 2, stabilized cylindrical plasma regions 41, 42 and 43 are produced. Metal segments 32 and 34 "short circuit" the discharge in the various positions adjacent thereto along the rod so that the plasmas are confined to the aforesaid regions adjacent the insulator rods. Use of such a segmented plasma excitation is known to result in an increase in the cooling rate, an increase in the plasma recombination rate and, hence, in higher laser gain and output power.

Figure 8:
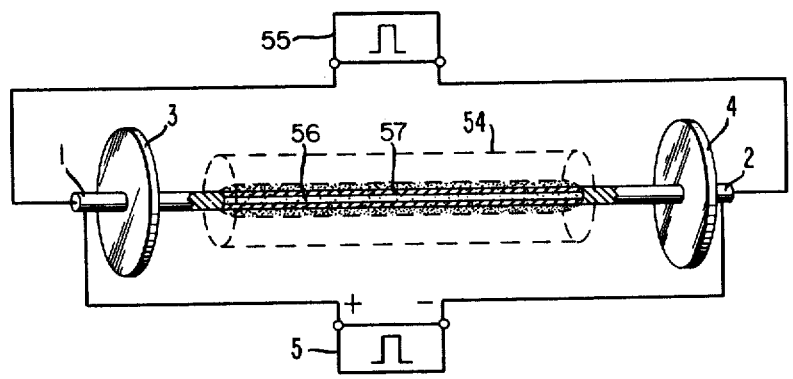
FIG. 8 shows, in pictorial form, the essential elements of an embodiment of the present invention which utilizes a UV flashlamp to help stabilize the discharge plasma.

FIG. 8 shows the essential elements of a further embodiment of the present invention. Gas filled flash lamp 56 is disposed between pin-type electrodes 1 and 2. When a pulse from means 55 is applied to flash lamp 56 UV light is provided. This UV light ionizes a small gas region 57 near the lamp. This preionized region 57 near flash lamp 56 tends to stabilize the plasma formation near or on the outer surface of the lamp. The further operation of this embodiment is as has been described hereinabove. In order to enhance th preionization process the gas volume surrounding flash lamp 56 may be seeded with a material that is easily photoionized with UV and that has no absorption at the desired recombination laser wavelength.

Figure 9:
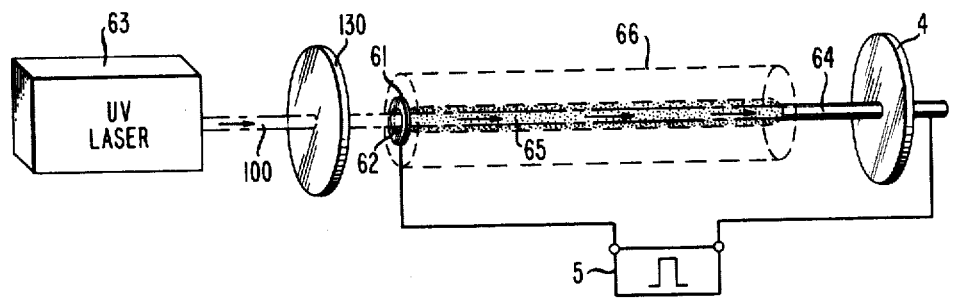
FIG. 9 shows, in pictorial form, the essential elements of embodiment of the present invention which utilizes UV laser preionization.

FIG. 9 shows the essential elements of a further embodiment of the present invention. Beam 100, output from UV laser source 63, passes through mirror 130 and UV transmitting window 62 in electrode 61 to impinge upon the gaseous laser material in region 65. The UV radiation preionizes the cylindrical gas volume on the axis of the gas cell. When a high-voltage, high-current pulse produced by means 5 is applied to metal ring electrode 61 and metal pin-type electrode 64, a stabilized plasma is produced in cylindrical region 64. The further operation of this embodiment is as has been described hereinabove.

Figure 10:
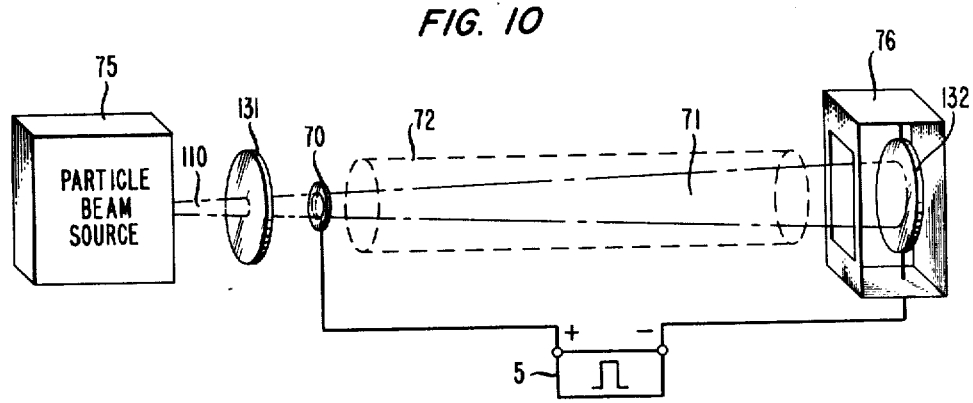
FIG. 10 shows, in pictorial form, the essential elements of an embodiment of the present invention which utilizes particle beam preionization.

FIG. 10 shows the essential elements of another embodiment of the present invention. Beams of particles 110, output from particle source 75, passes through mirror 131 and metal foil electrode 70 to impinge upon Faraday cup electrode 76. Faraday cup 76 includes a mirror 132, which mirror forms a resonant laser cavity with mirror 131. Mirror 132 may be, e.g., a metallic mirror. The particle beam produces a plasma on the axis of the gas cell in region 71. When a high-voltage, high-current pulse produced by means 5 is applied to metal electrode 70 and Faraday cup electrode 76, a stabilized plasma is produced in region 71. The further operation of this embodiment is as has been described hereinabove.

Figure 11:
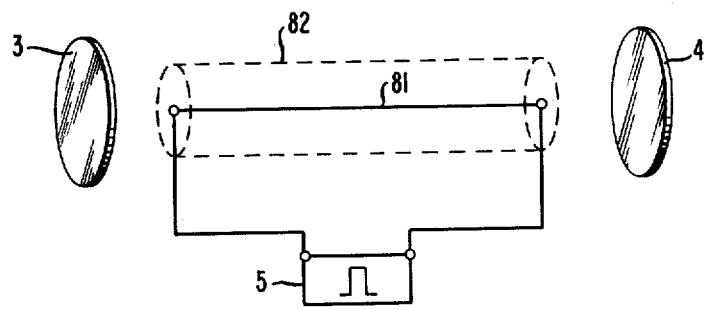
FIG. 11 shows, in pictorial form, the essential elements for an embodiment of the present invention which utilizes an exploding wire.

FIG. 11 shows the essential elements of a further embodiment of the present invention. Thin wire 81 is located on the axis of the gas cell. Enough current is caused to flow through the wire from means 5 so that it will explosively vaporize. This operates both to stabilize the discharge to a thin cylindrical region and to provide the active element. The initial dimensions of wire are selected to result in the optimum concentration of active element after vaporization.

It should also be clear to those skilled in the art that the embodiments described hereinabove may be utilized in a parallel operation. For example, a number of pairs of pin-type electrodes could be placed in a gas cell and pulsed simultaneously to provide a larger active volume.

In the following we discuss further considerations pertaining to embodiments of the present invention. Although the laser can be used to produce lasing in ionic species, the exposition is focused primarily on the neutral atom laser for the sake of clarity.

Figure 12:
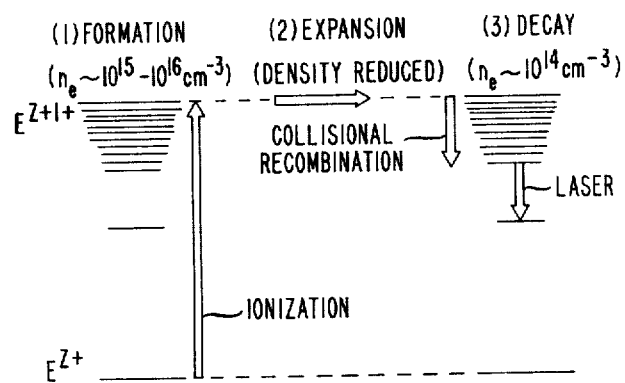
FIG. 12 shows, in pictorial form, an energy level diagram which illustrates the operation of a recombination laser.

An ideal plasma-recombination laser would operate in the following manner: The atoms of some element E are excited, e.g. by an electrical current pulse within a gaseous medium, and some fraction are ionized into state $E^{(Z+1)+}$, as shown in FIG. 12, where Z could be any charge state of element E. Under suitable conditions the resulting plasma of electrons and ions of element E expands and the density is reduced. The expanding hot electrons interact with a surrounding cool gas and are cooled, thereby causing the electron-ion recombination rate to increase rapidly. The electrons and ions recombine and the captured electrons move downward in energy, via collisions with the free electron continuum, through the highly excited states of $E^{Z+}$ until a significant gap in the energy levels of that charge state of E is reached. The collisional decay rate across the gap is reduced and produces a bottleneck, which bottleneck causes the population density to build up in levels immediately above the gap. A population inversion will then develop with respect to one or more lower levels and laser action can be achieved across the gap if a high decay rate for the lower laser level is present.

Figure 13:
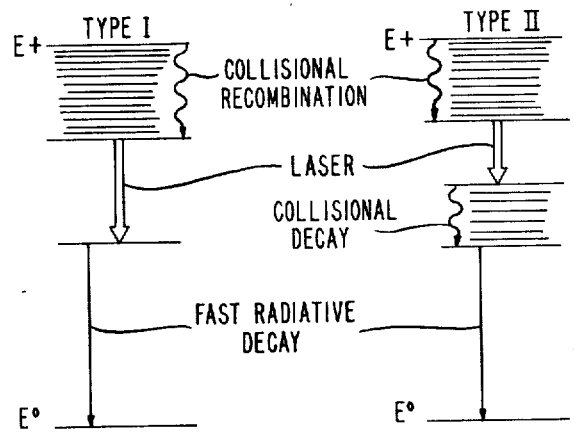
FIG. 13 shows in pictorial form the energy level diagram for Type I and Type II recombination lasers.
Figure 14:
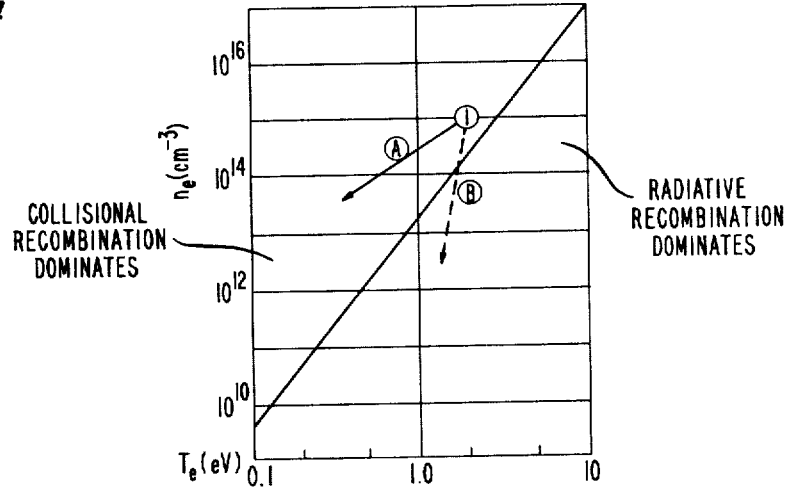
FIG. 14 shows a graph of the plasma electron density vs. plasma electron temperature, $n_e$ vs. $T_e$, which displays the regions where the collisional recombination mechanism and the radiative recombination mechanism compete.

Two possible decay schemes for the lower-laser-level are shown in FIG. 13. Type I or Type II decay schemes are possible depending upon the choice of atomic species, the charge state of that species and the exact plasma conditions. In either scheme a minimum number of atoms having electrons in the lower laser level is desirable.

The stage of ionization, i.e. the value of Z in $E^{Z+}$, is an important parameter in designing a recombination laser. To make a recombination laser that operates on a particular transition in $E^{Z+}$ it is necessary to have as large a fraction of the initial population in $E^{(Z+1)+}$ as possible since this will be the source of population for the upper laser level during the recombination process. For the lower ionization stages (Z=1,2,3) this requires an initial plasma density in the range of $10^{15}-10^{16}$ cm$^{-3}$ as shown in FIG. 12. The specific initial charge state (Z+1) is determined by the electron temperature during the formation of the plasma. In contrast with this relatively high initial electron density, the optimum plasma conditions for producing a population inversion have been found to lie at a somewhat lower plasma density, $10^{14}$ cm$^{-3}$ or slightly lower. This lower density is needed to minimize the unwanted collisional depopulation of the upper-laser-level. These two apparently conflicting density requirements can be met by producing the plasma in a relatively small volume and then letting it expand into a larger volume where density reduction, recombination, and consequently laser action can occur.

The efficiency of a recombination laser is determined by the product of three efficiency factors: the efficiency of ion production, the efficiency of recombination of ions into the upper laser level, and the quantum efficiency of the laser, i.e., the laser transition energy divided by the ionization energy. For the moment let us assume that the lower laser level is rapidly depleted.

First, we will discuss the efficiency of ion production. In an electrical excitation pulse, the principal energy losses during ion production are due to (a) direct excitation of levels in the atom which lie below the upper laser level, (b) excitation of electrons into unwanted excited states of the ion, (c) radiation losses by free-free transitions in the electron continuum, brehmstrahlung, and by free-bound transitions, radiative recombination, and (d) thermal heating of the atoms and the ions.

Loss (a), the loss due to direct excitation of lower levels is not a large loss if the electron density develops at a rapid rate since multi-step ionization can occur if the ionization rate from the lower excited levels exceeds their radiative decay rate. For the first excited state of an atom, where the untrapped radiative rate is typically $10^8$ sec$^{-1}$, the electron density at which the multi-step ionization occurs is in the range of $10^{15}$ to $10^{16}$ cm$^{-3}$. If the ground state atomic density is higher than $10^{14}$ cm$^{-3}$ then radiative trapping will reduce the radiative decay rate and thereby reduce the required electron density for multi-step ionization. For higher excited states, the electron density at which multi-step ionization dominates over untrapped radiative decay is in the range of $10^{13}$ to $10^{14}$ cm$^{-3}$.

Loss (b), excitation of electrons into unwanted excited states of the ion is not a significant energy loss factor as long as the electron temperature is kept low. While the specific requirements vary with different atomic species, the highest gas pressure and lowest breakdown voltage consistent with other restrictions discussed hereinbelow minimize this energy loss.

Loss (c), radiation losses in the form of free-free and free-bound transitions can become so large when the electron density becomes too high that atoms will be cycled through the excitation mechanism several times during an excitation electrical pulse. A description of these losses is given in an article entitled "A Calculation of the Instantaneous Population Densities of the Excited Levels of Hydrogen-like Ions in a Plasma," *Proceedings Phys. Soc.*, Vol. 82, 1963, pp. 641-654, by R. W. P. McWhirter and A. G. Hearn. Their calculations indicate that an upper limit for the electron density of $10^{16}$ cm$^{-3}$ would be required to minimize these losses for excitation pulses of 1 μs or less duration.

In a gas discharge at relatively low pressure and electron density, the electrons are heated to temperatures of the order of $10^4$ to $10^{5°}$ K., whereas the atoms and ions remain at 500°-1000° K. As the electron density and gas pressure are increased, the thermal heating of atoms and ions, loss (d), increases and thus more energy is wasted. We find that the thermal heating will be minimized when minimum electron densities consistent with those necessary to minimize direct excitation of levels below the upper laser level are maintained. One should also use gas pressures low enough to minimize arcing effects.

We will now discuss the efficiency of electron ion recombination into the upper laser level after the termination of the excitation energy pulse. Assuming the above-mentioned limitation of $10^{16}$ cm$^{-3}$ on electron density is satisfied, the total decay rate for ions during this phase of plasma evolution can be written as $$dN^{E+}/dt = (R_d + R_m + R_r + R_c)N^{E+} \tag{1}$$

where $N^{E+}$ is the ion density and $R_d$, $R_m$, $R_r$ and $R_c$ are the ambipolar diffusion loss rate, the molecular formation loss rate, the radiative recombination loss rate and the collisional recombination loss rate respectfully.

The diffusion decay rate for a tube in which the length is much greater than the bore radius r is given by:

$$R_d = (D_a/p)(2.4/r)^2 \tag{2}$$

where $D_a$ is the ambipolar diffusion coefficient, typically 800 cm$^2$ Torr sec$^{-1}$, and p is the gas pressure in Torr. For a 3 mm bore radius and a pressure of 1 Torr, the diffusion decay rate is approximately $5 \times 10^4$ sec$^{-1}$. As is evident from EQ. 2, this diffusion decay loss rate can be minimized by increasing gas pressure and increasing bore size.

The second ion decay mechanism involves the rate, $R_m$, or the conversion of E$^+$ ions to E$_2^+$ ions. While this mechanism is not well known for most ions, it is probably not significant as long as the density of the lasing species is kept below $\sim 10^{16}$ cm$^{-3}$. Even if the mechanism were significant, it would not necessarily produce a loss in efficiency in an atomic recombination laser since it is quite possible that dissociation of E$_2^+$ will occur into an atomic state at or above the upper laser level. We therefore assume that this mechanism has a negligible effect on reducing the efficiency of the laser.

The radiative recombination rate, $R_r$, can be approximated by the following expression for recombination from single ions to neutral atoms:

$$R_r \approx 2 \times 10^{-7} n_e T_e^{-\frac{1}{2}} \text{cm}^{-3}\text{sec}^{-1}, \tag{3}$$

where $n_e$ is the electron density in cm$^{-3}$ and $T_e$ is the electron temperature in eV. This mechanism involves the binding of an electron to an ion in a specific state of the neutral atom, either an excited state or the ground state, with the simultaneous emission of a photon. The photon has an energy equal to the difference between the free-electron energy and the bound state energy. This mechanism leads to an inefficiency in the recombination laser excitation because those atoms that recombine to bound levels lying below the upper laser level bypass the upper laser level during their subsequent decay. In addition, at lower plasma densities where radiative recombination dominates over collisional recombination, atoms in excited states lying above the upper laser level also bypass that level by radiative decay.

The collisional recombination rate, $R_c$, is approximated by:

$$R_c = 10^{-20} n_e^2 T_e^{-9/2} \text{cm}^{-3}\text{sec}^{-1}. \tag{4}$$

$R_c$ is much more sensitive to both $n_e$ and $T_e$ then is $R_r$. The collisional recombination mechanism is the most effective one in providing an efficient recombination laser since every electron that recombines with E$^+$ through this mechanism is moved downward in energy by collisions with free-electrons having density $n_e$ and temperature $T_e$. The highest rate of downward movement is to energetically adjacent levels, i.e., the population moves downward in energy in small steps. Thus, every electron that recombines by this mechanism is moved downward to the upper laser level. The recombination efficiency factor could approach 100 percent, where $R_c$ is greater than $R_d$, $R_m$, and $R_r$, if an atomic species having an appropriate level scheme is available when a large inversion occurs during the collisional recombination mechanism in order to allow all of the energy to be extracted from the upper laser level, by stimulated emission.

The value of $n_e$ and $T_e$ at which $R_c$ equals $R_r$ is obtained from EQS. 3 and 4 and is given by $$n_e = 2 \times 10^{13} T_e^{3.75}. \quad (5)$$

FIG. 13 shows a graph of this equation. The region above and to the left of line 100 where $R_c$ dominates over $R_r$, is the region which denotes the necessary condition for an efficient recombination laser. For example, if a single ionized plasma is formed with an electron temperature, $T_e = 2$ eV and electron density, $n_e = 10^{15} cm^{-3}$, its initial location of FIG. 13 would be at Position 1. Such a set of initial conditions is not unreasonable for a predominantly single ionized plasma with a high percentage of ionization. As such a plasma begins to evolve, expansion and cooling cause its electron density and temperature to decrease. This evolution corresponds to a movement of the plasma position in FIG. 13 with time. Such a motion will trace out a "cooling trajectory". As might be expected some cooling trajectories lead to lasers with higher gains and higher efficiencies. For example, Trajectory A, shown in FIG. 13, will lead to higher gain than Trajectory B, shown in FIG. 13, since Trajectory B leads to conditions where radiative recombination becomes significant. One way to achieve a cooling trajectory such as A would be to allow the plasma to expand into a cooler surrounding gas. This would cause the electron temperature, $T_e$, to drop faster than the electron density, $n_e$. It is thought that such a technique can be used to make $R_c$ the dominant cooling mechanism and thus make the recombination efficiency factor approach 100 percent.

This discussion of the ion loss mechanisms shows that $R_d$, $R_m$, and $R_r$ should be minimized and $R_c$ should be maximized to provide a maximum number of atoms having electrons in the upper laser level. If the laser is based on a Type I decay scheme and the radiative decay of the lower laser level is to the ground state of the neutral atom, the decay rate would begin to be reduced by radiation trapping effects when a neutral atom density of $10^{13}$ to $10^{15} cm^{-3}$ is reached ($\sim 10^{-3}$ to $10^{-1}$ Torr) depending on the transition probability and the particular experimental arrangement. At higher gas temperatures the density could be higher due to the reduction of trapping as the linewidth increases, but at the cost of a higher energy loss to gas heating. If the decay of the lower laser level is predominantly to an excited state with subsequent decay to the ground state, a neutral atomic density on the higher side of that quoted above can be tolerated before trapping effects reduce the lower laser level decay rate.

If the laser is based on a Type II decay scheme, the decay of the lower laser level is determined by $n_e$ and $T_e$. Here the higher the electron density and the lower the electron temperature, the more effective is the decay process of the lower laser level. Because these conditions are also the optimum conditions for collisional recombination, the depletion of the lower laser level is automatically provided for when an atomic system is chosen which has a suitable group of levels, of which the lower laser level is a high lying level. The electron density should be kept low enough to minimize electron collisional de-excitation across the gap, which de-excitation would result in a radiationless depletion of the upper laser level. In hydrogen, for example, the $n = 3$ level would have an electron collisional destruction rate $10^8 sec^{-1}$ for an electron density of $10^{15} cm^{-3}$, which rate is comparable to the untrapped radiative decay rate for that level.

In summary then, as far as the plasma production is concerned, electron densities greater than $10^{15} cm^{-3}$ are required to minimize excitation losses to low lying excited states. A relatively low $T_E$ of the order of a few eV would then minimize the population of excited ionic levels. Radiation losses could be held to a minimum by keeping the electron density less than $10^{16} cm^{-3}$ and thermal heating of atoms would be minimized by having a relatively low gas pressure (<100 Torr). As far as plasma-recombination is concerned, diffusion losses are minimized by having high pressure, radiative recombination is minimized by having high $n_e$ and low $T_e$, and radiative trapping is minimized by the lasing species having densities of the order of $10^{15} cm^{-3}$ or less.

To produce an efficient atomic recombination laser, plasma conditions must be established that satisfy all of these requirements. An electron density in the range of $10^{15}$–$10^{16} cm^{-3}$ would satisfy all requirements for $n_e$. However, because the upper limit for the ground state density of the lasing species is $\sim 10^{15} cm^{-3}$ (due to restrictions on radiative trapping) an additional upper limit of $10^{15} cm^{-3}$ is placed on the electron density since each electron originates from the ionization of a neutral atom (multistage ionization is not desired except for the ionic transitions). This low pressure ($\sim 10^{-1}$ Torr) requirement would make it impossible to keep $T_e$ low and would also significantly increase diffusion losses. However, the addition of a buffer gas would reduce $T_e$, reduce the diffusion loss rate to the walls, and at the same time provide a background gas into which the plasma could expand and cool in order to optimize the cooling trajectory. Adding a buffer gas does introduce the possibility of excitation and ionization energy being lost to the buffer gas species. However, if a high ionization potential gas such as He is used, most of the ionization energy would go to the lower ionization potential laser species and any ionization energy taken by the He would most likely be transferred back to the laser species via charge transfer or Penning ionization. In addition, the low mass of the He atoms would provide an ideal rapid cooling mechanism for the electrons as the plasma expands into the cool surrounding gas. Implicit in these requirements is the fact that the plasma would have to be produced in only a small fraction of the available volume such that it can subsequently expand into the larger volume and cool.

Based upon the considerations discussed hereinabove we can specify the range of parameters which we feel will produce the best mode of operation for an efficient recombination laser operated by electrical discharge. We would choose a pressure in the range of $10^1$ to $10^2$ Torr for a He background gas. We would choose a current in the range of $10^2$ to $10^3$ amperes through a 1 cm diameter area. This is based on a calculation that will provide $\sim 10^{15} \text{cm}^{-3}$ initial $n_e$ in a background He pressure of 30 Torr. Based upon experimental data this would provide a uniform discharge initially confined to a cylindrical region of small diameter. Finally we would choose a pressure in the range of $10^{-3}$ to $10^{-1}$ Torr for the laser species. This is based upon the requirement of maximum ion density which prevents radiative trapping from restricting decay of lower laser levels.

It is clear to those skilled in the art that these conditions will provide $T_e$ in the range of 1 to 10 eV. The lower bound of 1 eV is needed so that electron-ion recombination is inhibited until the plasma expands sufficiently to where $n_e$ has the value specified hereinabove and shown in FIG. 12. The upper bound of 10 ev is used to keep down the rate of double ionization of the laser species, which double ionization will lower the laser efficiency.

TABLE I

| Laser Mat. | $\lambda(\mu m)$ | Transition | Ion. Pot. (eV) | Quan. Eff. | Theo. Laser Eff. |
|---|---|---|---|---|---|
| Kr | 3.06 | $6p[\frac{1}{2}] - 6s[3/2]^\circ$ | 13.996 | 2.9 | 1.9 |
| Xe | 2.02 | $5d[3/2]^\circ - 6p[3/2]$ | 12.127 | 5.1 | 3.3 |
| Ar | 1.27 | $3d[3/2]^\circ - 4p[\frac{1}{2}]$ | 15.755 | 6.2 | 4.0 |
| Cu | 1.82 | $4f^2F^\circ - 4d^2D$ | 7.724 | 8.8 | 5.7 |
| Ag | 1.84 | $4f^2F^\circ - 5d^2D$ | 7.574 | 8.9 | 5.8 |
| Be | 1.49 | $3p^3P^\circ - 3s^3S$ | 9.32 | 8.9 | 5.8 |
| Cd | 1.43 | $6p^3P^\circ - 6s^3S$ | 8.991 | 9.7 | 6.3 |
| Zn | 1.31 | $5p^3P^\circ - 5s^3S$ | 9.391 | 10.1 | 6.6 |
| Mg | 1.50 | $4p^3P^\circ - 4s^3S$ | 7.644 | 10.8 | 7.0 |
| C | 0.941 | $3p^1D - 3s^1P^\circ$ | 11.264 | 11.7 | 7.6 |
| Al | 1.67 | $4d^2D - 4p^2P^\circ$ | 5.984 | 12.4 | 8.1 |
| Pb | 1.31 | $7d^3F_3^\circ - 7p^3D_2$ | 7.415 | 12.7 | 8.3 |
| Na | 1.85 | $4f^2F^\circ - 3d^2D$ | 5.138 | 13.1 | 8.5 |
| Sr+ | 0.416 | $6s^2S - 5p^2P$ | 16.72 | 17.8 | 11.6 |
| Ca+ | 0.371 | $5s^2S - 4p^2P$ | 17.98 | 18.6 | 12.1 |

A number of examples of neutral atoms (and a few ions) are listed in Table I along with the potential laser efficiencies based upon the considerations discussed hereinabove. The transitions are listed in order of increasing efficiency. These particular elements were chosen somewhat arbitrarily, with the exception that most have relatively low ionization potentials, since gaps in excited state energy level distributions can be found in many elements. The element is listed in the first column. The wavelength and identification of a gap transition are shown in the second and third columns. The fourth column lists the quantum efficiency in percentage, i.e., the laser transition energy divided by the ionization potential. The fifth column lists the theoretical laser efficiency based upon 65 percent ionization efficiency and 100 percent collisional recombination to the upper laser level.

In practice, the efficiency is expected to be reduced below that listed in Table I by the inability to extract all the energy from the given cell.

We claim:

1. A recombination laser providing laser radiation which comprises:
   at least one resonant laser cavity including energy abstracting means;
   a laser material; and
   excitation means for generating from said laser material at least one plasma discharge confined to a cylindrical region, said at least one plasma discharge radially expanding into a second region, at least a portion of said second region being disposed in said at least one resonant laser cavity, said laser material being chosen such that a population inversion is produced therein by recombination of electrons and ions in said plasma.

2. A recombination laser as defined in claim 1 which further includes a background gas for cooling the electrons in said plasma discharge.

3. A recombination laser as defined in claim 2 wherein said background gas is He.

4. A recombination laser as defined in claim 2 wherein said excitation means comprises pin-type electrodes (1 and 2) aligned substantially parallel to the axis of said at least one resonant laser cavity and means (5) for applying high-voltage, high-current pulses to said pin-type electrodes.

5. A recombination laser as defined in claim 4 wherein said excitation means further comprises an insulator rod (25) disposed between said pin-type electrodes.

6. A recombination laser as defined in claim 4 wherein said excitation means further comprises a flash lamp means (56) for producing UV radiation disposed between said pin-type electrodes and means (55) for triggering said flash lamp means.

7. A recombination laser as defined in claim 6 which further includes a material ionizable by UV radiation.

8. A recombination laser as defined in claim 2 wherein said excitation means comprises pin-type electrodes (1 and 2) aligned substantially parallel to the axis of said at least one resonant laser cavity;
   means (5) for applying high-voltage, high-current pulses to said pin-type electrodes; and
   a plurality of alternating insulator rods (31, 33, 35) and metal rods (32, 34) disposed between said pin-type electrodes.

9. A recombination laser as defined in claim 2 wherein said at least one resonant laser cavity (130 and 4) includes mirror means (130), which mirror permits the passage of ultraviolet radiation therethrough and
   said excitation means comprises a pin-type electrode (64), apertured electrode means (61) for providing the passage of ultraviolet radiation therethrough, means (5) for applying high-voltage, high-current pulses to said pin-type electrode and said apertured electrode means and a laser source (63) of UV radiation for generating a beam of UV laser radiation (100), which radiation passes through said mirror means and said apertured electrode means along a path which is substantially parallel to the axis of said at least one resonant laser cavity.

10. A recombination laser as defined in claim 2 wherein
   said at least one resonant laser cavity (131 and 132) includes mirror means (131), which mirror means permits the passage of particles therethrough and
   said excitation means comprises a Faraday cup electrode (76), apertured electrode means (70) for providing the passage of a beam of particles therethrough, means for applying high-voltage, high-current pulses to said Faraday cup electrode and said apertured electrode means and a particle beam source (75) for producing a beam of particles (110), which beam passes through said mirror means and said apertured electrode means toward said Faraday cup electrode along a path which is substantially parallel to the axis of said at least one resonant laser cavity.

11. A recombination laser as defined in claim 1 wherein said excitation means comprises pin-type electrodes (1 and 2) aligned substantially parallel to the axis of said at least one resonant laser cavity and means (5) for applying high-voltage, high-current pulses to said pin-type electrodes.

12. A recombination laser as defined in claim 11 wherein said excitation means further comprises an insulator rod (25) disposed between said pin-type electrodes.

13. A recombination laser as defined in claim 11 wherein said excitation means further comprises a flash lamp means (56) for producing UV radiation disposed between said pin-type electrodes and means (55) for triggering said flash lamp means.

14. A recombination laser as defined in claim 13 which further includes a material ionizable by UV radiation.

15. A recombination laser as defined in claim 1 wherein said excitation means comprises pin-type electrodes (1 and 2) aligned substantially parallel to the axis of said at least one resonant laser cavity;
   means (5) for applying high-voltage, high-current pulses to said pin-type electrodes; and
   a plurality of alternating insulator rods (31, 33, 35) and metal rods (32, 34) disposed between said pin-type electrodes.

16. A recombination laser as defined in claim 1 wherein
   said at least one resonant laser cavity (130 and 4) includes mirror means (130), which mirror means permits the passage of ultraviolet radiation therethrough and
   said excitation means comprises a pin-type electrode (64), apertured electrode means (61) for providing the passage of ultraviolet radiation therethrough, means (5) for applying high-voltage, high-current pulses to said pin-type electrode and said apertured electrode means and a laser source (63) of UV radiation for generating a beam of UV laser radiation (100), which radiation passes through said mirror means and said apertured electrode means along a path which is substantially parallel to the axis of said at least one resonant laser cavity.

17. A recombination laser as defined in claim 1 wherein
   said at least one resonant laser cavity (131 and 132) includes mirror means (131), which mirror means permits the passage of particles therethrough and
   said excitation means comprises a Faraday cup electrode (76), apertured electrode means (70) for providing the passage of a beam of particles therethrough, means for applying high-voltage, high-current pulses to said Faraday cup electrode and said apertured electrode means and a particle beam source (75) for producing a beam of particles (110), which beam passes through said mirror means and said apertured electrode means toward said Faraday cup electrode along a path which is substantially parallel to the axis of said at least one resonant laser cavity.

18. A recombination laser providing laser radiation which comprises:
   at least one resonant laser cavity (3 and 4) including energy abstracting means;
   at least one thin wire of laser material (31) aligned substantially parallel to the axis of said at least one resonant laser cavity; and
   excitation means (5) for applying a high-voltage, high-current pulse to said at least one thin wire to convert said at least one thin wire into a plasma, said at least one thin wire of laser material chosen such that a population inversion is produced therein by recombination of electrons and ions in said plasma.

* * * * *